United States Patent
Niklaus

(10) Patent No.: US 9,774,988 B1
(45) Date of Patent: Sep. 26, 2017

(54) SYSTEM AND METHOD FOR SINGLE RADIO MULTI-DEVICE COMMUNICATION

(71) Applicant: SEMICONDUCTOR COMPONENTS INDUSTRIES, LLC, Phoenix, AZ (US)

(72) Inventor: Markus Peter Niklaus, Fenin (CH)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/162,973

(22) Filed: May 24, 2016

Related U.S. Application Data

(60) Provisional application No. 62/302,377, filed on Mar. 2, 2016.

(51) Int. Cl.
  *H04B 5/00* (2006.01)
  *H04W 4/00* (2009.01)
  *H04W 72/04* (2009.01)
  *H04W 76/02* (2009.01)
  *H04R 25/00* (2006.01)

(52) U.S. Cl.
  CPC ......... *H04W 4/008* (2013.01); *H04R 25/554* (2013.01); *H04W 72/0453* (2013.01); *H04W 76/025* (2013.01); *H04R 2225/51* (2013.01)

(58) Field of Classification Search
  CPC .. H04R 25/554; H04R 25/552; H04R 25/558; H04R 2225/55; H04R 25/70; H04R 2225/41; H04R 2420/07; H04R 25/556; H04R 25/505; H04R 2225/33; H04R 2460/03; H04R 5/033; H04R 2225/61; H04R 2227/003; H04R 25/30; H04R 25/43; H04W 4/008; H04W 76/023; H04W 84/18; H04W 84/20; H04W 8/005; H04W 76/02; H04W 84/22; H04W 88/04; H04M 1/7253; H04M 1/6066; H04M 1/72519; H04M 1/20; H04M 1/2474; H04M 1/605; H04M 1/72591; H04M 9/082

See application file for complete search history.

(56) References Cited

U.S. PATENT DOCUMENTS

| | | | |
|---|---|---|---|
| 2012/0087506 A1 | 4/2012 | Ozden | |
| 2012/0093324 A1 | 4/2012 | Sinasi | |
| 2012/0281843 A1* | 11/2012 | Christensen | H04B 5/0075 381/23.1 |
| 2013/0202066 A1* | 8/2013 | Alzaher | H04B 1/406 375/340 |
| 2014/0169599 A1* | 6/2014 | Solum | H04R 25/554 381/315 |
| 2015/0124976 A1* | 5/2015 | Pedersen | H04R 25/552 381/23.1 |
| 2016/0249356 A1* | 8/2016 | Pope | H04W 4/008 |

\* cited by examiner

*Primary Examiner* — Golam Sorowar
(74) *Attorney, Agent, or Firm* — Robert F. Hightower

(57) ABSTRACT

Aspects of the present disclosure involve a system and method for communicating with multiple devices using a single radio. In one embodiment, a wearable device is configured to use a single radio for near-field and far-field communications. In another embodiment, the wearable device is configured to include an adaptable radio filter that enables the near-field and far-field transmission. The wearable device may further include an adaptable radio IC whose physical layer parameters are adjusted based in part of the transmission mode of a received signal.

16 Claims, 6 Drawing Sheets

SYSTEM AND METHOD FOR SINGLE RADIO MULTI-DEVICE COMMUNICATION

CROSS-REFERENCE TO RELATED APPLICATION

This patent application claims the benefit of and priority to U.S. Provisional Application No. 62/302,377, filed Mar. 2, 2016, and entitled "SYSTEM AND METHOD FOR SINGLE RADIO MULTI-DEVICE COMMUNICATION," which is incorporated herein by reference for all purposes.

TECHNICAL FIELD

This disclosure relates generally to multi-device wireless communications.

BACKGROUND

As today's technological market is rapidly standardizing the ability for multiple devices to communicate, the need for devices that can communicate at multiple frequencies and in varying transmission modes is often necessary to maximize typical radio link metrics such as range, data throughput, power consumption, immunity to interference, etc. to trade off very different use cases: for example long range communication with industry standard radios (protocols) or very short range, proprietary around the human body, requiring extremely low power consumption. To accommodate, industry has adopted the use of multiple radios located within the device for the communication at the varying frequencies and transmission modes. The use of multiple radios, although an efficient solution for larger devices, can be difficult to accommodate in smaller devices such as wearables, where multiple radios can lead to increased complexity, costs, and consumed device real estate.

DETAILED DESCRIPTION

Aspects of the present disclosure involve systems, methods, devices and the like for communication with multiple devices using a single radio. In one embodiment, a system is configured to use a single radio for near-field and far-field communications by dynamically adapting the physical layer metrics of the system. As the system detects an incoming signal, the signal is analyzed to determine the source type and operational bandwidth. With knowledge of the source type and bandwidth (transmission mode), the system is able to dynamically adapt its parameters including the channel bandwidth for correct signal processing of the incoming signal without the need for a secondary radio. In certain wearable devices, this single-radio system allows the device to communicate in far-field with a first device and in near-field with another device without the need for two separate radios contained within the device.

Figure 1:
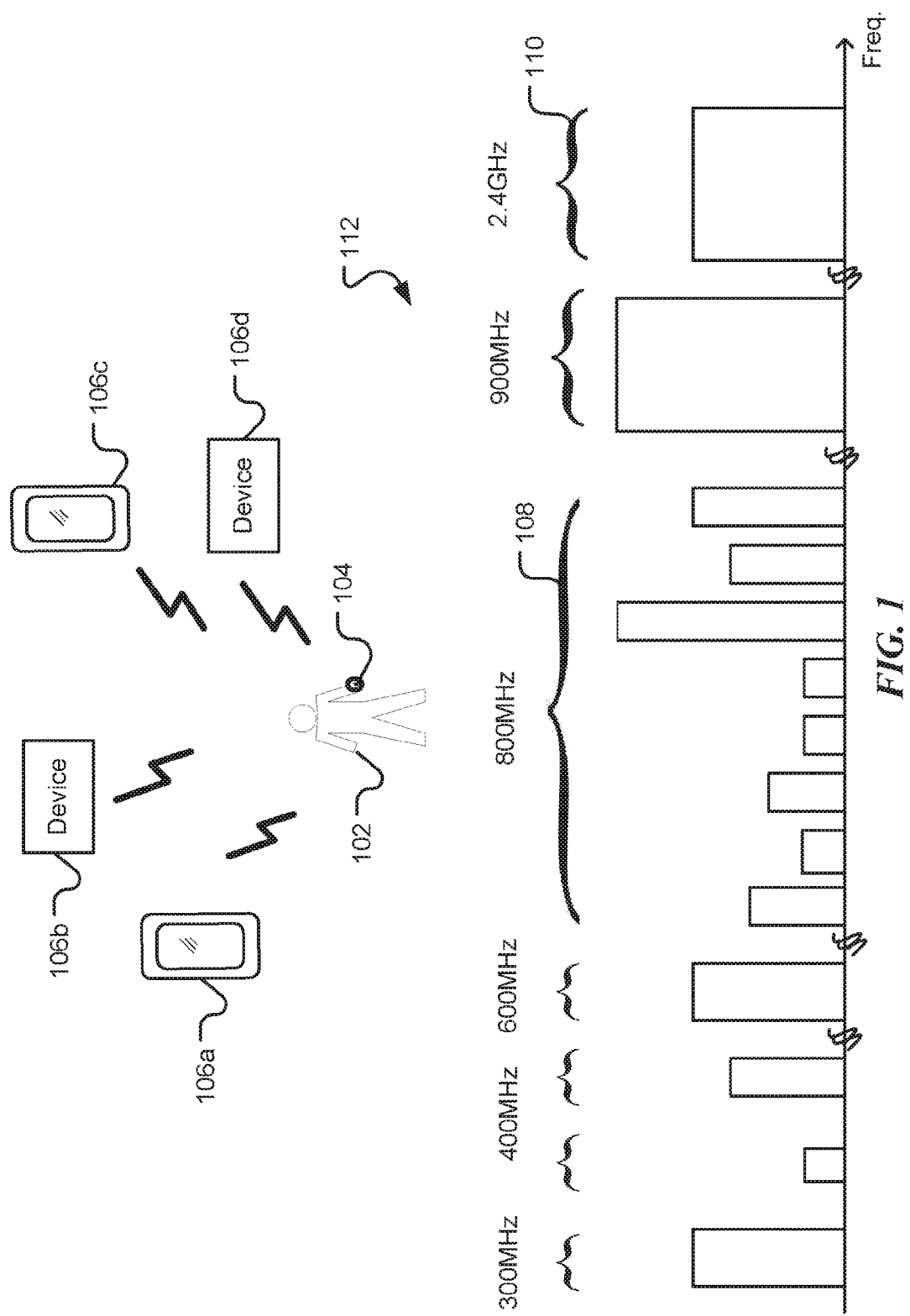
FIG. 1 is a diagram illustrating multi-device communications.

Multi-device communication is a commonplace in today's interconnected world. As such, the use of multiple radios in a device is often necessary to enable the communication between these devices. FIG. 1, for example, is a diagram illustrating multi-device communications. In particular, FIG. 1 illustrates a user 102 with a wearable device 104 communicating with one or more other devices 106a-d. Devices 106a-d can include, but are not limited to, smartphones, tablets, laptops, televisions, other wearables, and the like. These devices 106a-d and wearable device 104 can wirelessly communicate with one another directly using radio waves or over a network. The devices 106a-d can communicate using one or more of a Bluetooth®, Zigbee, WLAN, WMAN, WPAN, NFC, cellular, or other network to communicate. Further, the communication between the devices can be a near-field and/or far-field communication and at varying frequencies.

Near-field communication includes the communication between devices established over a short range. For example, near field magnetic induction (NFMI) is a short range (about <1 m) communication that may be used for around the body communication. A NFMI system may communicate by coupling a non-propagating, often low power magnetic field between communicating devices. Alternatively, far-field communications includes communication between devices through the transmission of energy over free space at a larger range (about <10 m). For example, Bluetooth® communication is a communication at far field which includes the use of radio waves in the 2.4 GHz ISM frequency band. Bluetooth communications unlike NFMI can occur within a personal area network (PAN).

As indicated above, communication between devices interconnected over varying networks may often require operation of the device at distinct frequencies. For example, FIG. 1 provides the frequency spectrum designations 112 for communications in the 300 MHz to 2.4 GHz range. The frequency spectrum designations 112 provide an illustration of how some sub-GHz and GHz bands can widely vary in bandwidth, standard, power level, etc. For example, at the 800 MHz band 108, at least 8 varying frequency allocations exist. Further, the frequency allocations can exist at varying bandwidths (spanning between 50-600 kHz), are regulated by ETSI, FCC, and belong to the ISM band. As another example, the 2.4 GHz band 110 is a spectrum that spans about 83.5 MHz and is internationally designated an ISM band for world wide availability. Currently, the 2.4 GHz frequency band is a widely popular band that is reserved internationally for use for industrial, scientific, and medical purposes. The ISM band is free to use and thus commonly used by industry. For example, Bluetooth®, IEEE 802.11 WiFi®, Zigbee® are a few of the technologies operating at this frequency.

Because varying standards (Bluetooth®, Zigbee®, etc.) and regulatory (i.e., FCC, ETSI, etc.) bodies exist, radio parameters are often fixed or limited by these standards and regulatory bodies to enable radio communication to co-exist and be interoperable. Therefore, multiple radios are often added to devices, which enable the correct physical layer metrics to be set for each of the respective technologies. However, the use of multiple radios, although suitable for larger devices, is not an adequate solution for smaller devices (e.g., wearable device 104). Smaller devices not only have limited real estate, they also have a more limited processing capability and energy supply over the larger devices. Therefore, having two radios within a small device constrains not only the available space, but also introduces added complexity and increased bill of materials (BoM) not acceptable for smaller devices. Thus, to be able to benefit from the ability to communicate with multiple devices 106*a-d* without the complexity, a novel approach for communicating with multiple devices 106*a-d* operating over different technologies is provided herein.

Figure 2:
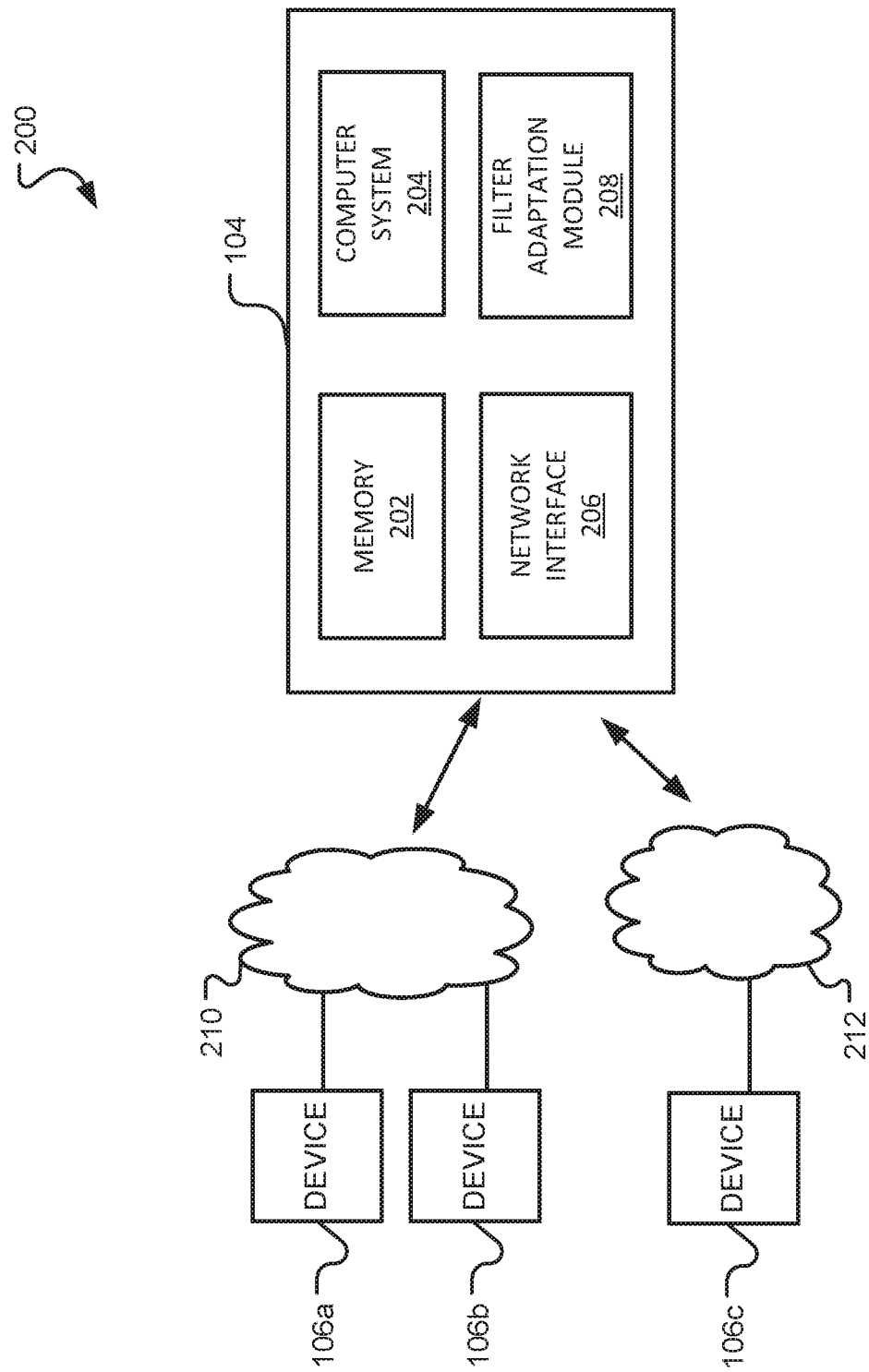
FIG. 2 is a diagram illustrating a system for multi-device communication with a wearable device with one radio.

In one embodiment, a method for adapting between technologies without the need for the added radio is introduced. FIG. 2, for example, is a diagram illustrating a system where multi-device communication is possible using one radio. Specifically, FIG. 2 illustrates wearable device 104 communicating over one or more networks 210, 212 with a devices 106*a-d* using a single radio. In addition, wearable device 104 can communicate with devices 106*a-d* directly without an intervening network. The wearable device 104 can be any device of small form factor for communicating with multiple devices 106*a-d*. For example, wearable device 104 can be a hearing aid with the ability to communicate with a secondary hearing aid and a smart phone. Specifically, the hearing aid may communicate with the secondary ear's hearing aid using near field ear-to-ear communication (over network 210) and with the smart phone using far-field communication (over a second network 212).

In such instance, hearing aids may utilize two radios. One radio may operate between 2.8 MHz-10.6 MHz for NFMI in short range ear to ear communication, and the other radio may operate at 2.4 GHz for smartphone Bluetooth Low Energy (BLE) far field communication. For example, ear to ear communication may occur between hearing aids as the audio from one hearing aid is use to correct and/or mitigate noise encountered by the other hearing aid. As another example, BLE communication may occur between a hearing aid and a smartphone that may be use as a remote control for a smart television. The use of two radios, however, can be quiet cumbersome as the dual radio brings added complexity and increase in hearing aid size, which is often undesirable. Thus, eliminating one of the radios would be a favorable solution. However, because Bluetooth® technology is standardized and operates under the specified physical layer parameters that have been pre-established by the standards bodies; the BLE enabled radio may not be eliminated if the hearing aid wants to communicate with a Bluetooth® enabled device (e.g., smart phone or television).

Thus, manipulating a Bluetooth® enabled radio is not a favorable solution. Further, the propagation physics of Bluetooth® technology are not well suited for around the body (e.g., ear to ear) communication as signals can get absorbed and/or reflected from and by the head. In general, signal absorption and reflection can be compensated by increasing the signal power. However, this increase in power can be problematic in wearable devices 104, as such increase in power can quickly reach the wearable's power budget. In addition, BLE communication introduces a link latency that will typically be too high to allow for real time audio communication. (A near zero latency is desired for acceptable ear to ear communication.) Finally, the BLE protocol is generally too complex and thus too power hungry for ear to ear (E2E) communication.

Thus, a single radio wearable device 104 is introduced with the capacity to be completely operable in standardized mode (e.g., Bluetooth®) and at least a proprietary mode (which is not standardized) at different frequencies. To accomplish this, the architecture of wearable device 104 is illustrated in FIG. 2, to include a filter adaptation module 208. Filter adaptation module 208, may be a module which enables the use of wearable device 104 with switchable transmission modes, where the radio IC includes an intermediate frequency (IF) filter that is reprogrammable. In the filter adaptation module 208, the processing required for enabling near-field and far-field communication can occur. In one embodiment, filter adaptation module 208 can perform the processing necessary so that the IF filter is programmed to operate under standards conditions (which may be generally in wide band mode) and then be re-programmed to operate in narrow band mode. For example, in a hearing aid, a radio IC may exist that is fully BLE capable however, is reprogrammable to operate in a proprietary mode (e.g., in E2E communication) when desired. The proprietary mode would enable the radio link parameters, such as the IF filters, to be modified so that the radio link can be optimized for the desired ear to ear communication.

In addition, to benefit from and enable the multi-device communication, the architecture of the wearable device 104 can include at least a computer system 204, a memory 202, a network interface 206 and the filter adaptation module 208 as discussed. The computer system 204 can be a system which includes one or more processors for handling the data received for the various devices, for processing the functions that amplify and correct the signals received for improved user experience (e.g., corrected and amplified signal received at the hearing aid), and other functions. Memory 202 can be the storage location where the data received from another device (including other hearing aids) and other similar data may be stored. The network interface 206 can be a module used to provide the interface necessary to communicate wirelessly over network 210 with devices 106*a-c*. Note that devices 106*a-c* can include, but are not limited to, smart phones, televisions, tablets, hearing aids, wearables, and the like. Further note that the architecture of the wearable device 104 or other device is not limited to the modules described above and can include one or more radios, subsystems and other components which will be described in more detail below and in conjunction with FIGS. 5 and 6.

In some instances, the wearable device 104 may be a hearing aid enabled for E2E communication, in which sound clips may be exchanged between ears (by streaming sound between the left and right ears) for an improved listening experience. In such instances, the wearable device 104 can further be enabled for E2E communication, in which the acoustics of the ear can be corrected and noise mitigated. For example, a person with a hearing aid 104 may be driving a car, in which case the person may be exposed to wind from an open window in one ear and conversations with a passenger in another. Using the wearable device 104 with E2E communications, the wind noise may be suppressed while the voice in the conversation may be amplified to improve the user experience.

In other instances, the hearing aid may be enabled for BLE communications. In such instances, the wearable device 104 may communicate with a BLE enabled device for control of the device. For example, the wearable device 104 may be paired with a smart television 106*a*, which enables the hearing aid user to control the volume of the television to the hearing aid without increasing the volume of the television to the room. In another example, the wearable device 104 may be connected to a smartphone 106*b* which can be used to control other devices. Thus, the wearable device 104 (e.g., hearing aid) can communicate both in near-field with a paired hearing aid and far-field with a smart device using at least the filter adaptation module 208. Note that this case can typically occur in a time division transmission, where wearable device 104 can communicate with a far-field device at times and with a near-field device at other times. The communication can occur by dynamically adapting the filter adaptation module 208, where switching between both modes occurs so rapidly that the perception may be that both near-field and far-field communications occur simultaneously.

Figure 3:
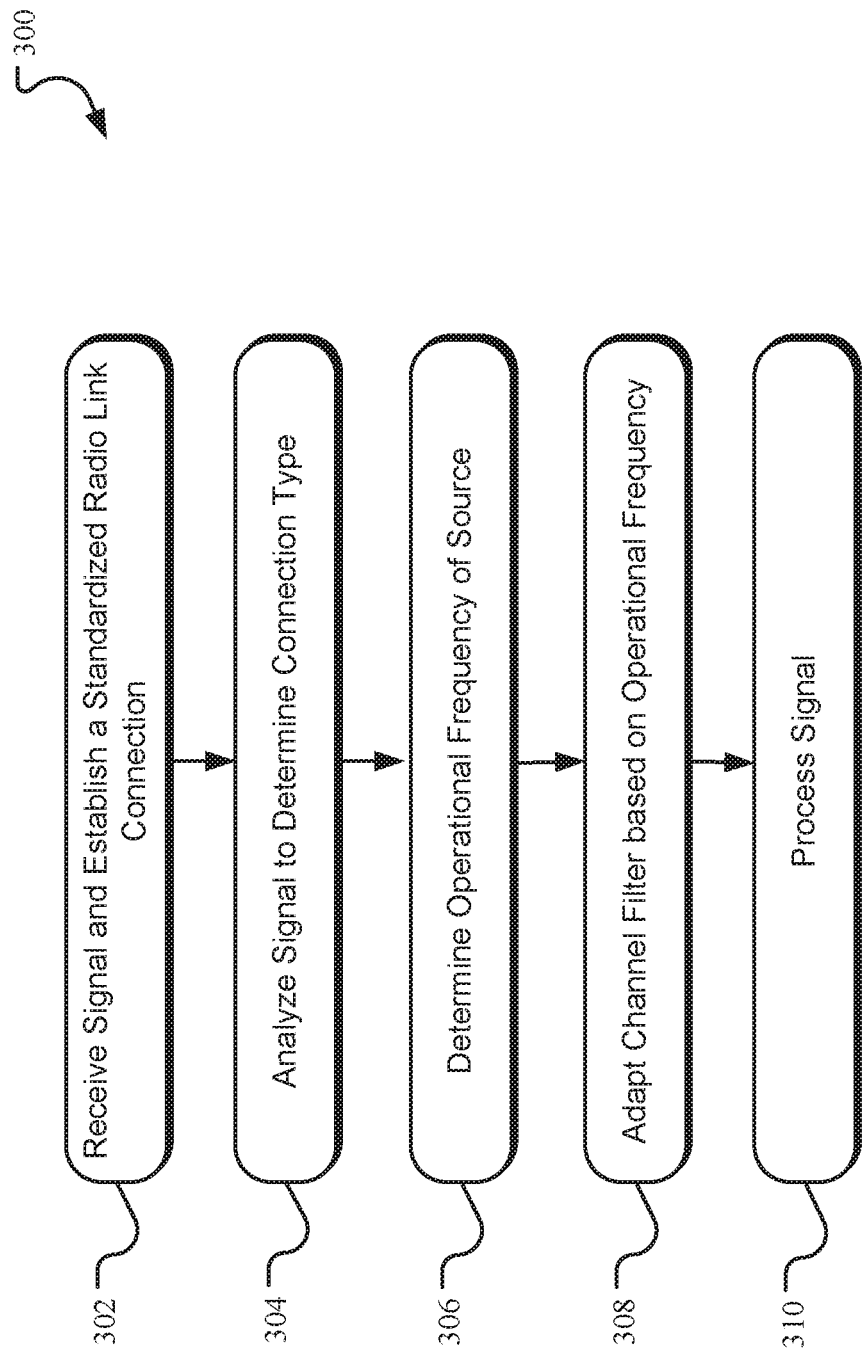
FIG. 3 is a flowchart of a method for dynamic filter adaptation for multiple device communication with a wearable device with one radio.

FIG. 3 is a flowchart of a method 300 for a device to accommodate near-field and far-field communications using a single radio circuit. Specifically, FIG. 3 is a flowchart of a method 300 for a wearable device 104 to adapt its radio link parameters for multi-device communication with devices operating in near-field and/or far-field. Method 300 begins with operation 302, where the wearable device 104 (e.g., hearing aid) receives a signal from a device wanting to communicate with the wearable device 104. In one embodiment, the signal received may arrive in response to a beacon sent by the wearable device 104 looking to connect. In another embodiment, the signal received in operation 302 may arrive from a device transmitting a signal looking to be discovered. In most cases, the communication first be established using a standard radio link or protocol.

In operation 304, the signal received is analyzed to determine the connection type that is desired. That is to say the wearable device 104 determines the type of network connection to be established. For example, the signal may derive from a router 106 looking to establish a WLAN connection. The router may have transmitted a beacon whose signal was received by the wearable device 104. In another example, the signal may derive from a smartphone 106 that is Bluetooth® enabled and/or Bluetooth Low Energy (BLE) and available to connect with the wearable device 104. Still in another example, the signal may derive from another wearable device 106 looking to pair with the current wearable device 104 over a proprietary frequency.

In operation 308, the wearable device 104 is enabled to function under the standardized channel metrics once the received signal is determined to be from a device 106 establishing a connection over a standardized network. The radio located within the wearable device 104 is enabled to operate under pre-defined physical layer parameters established by the standard. If the signal arriving is determined to be from a device 106 establishing a connection over a proprietary spectrum, then the wearable device 104 enabled to function under standardized physical layer metrics is adapted to operate at the proprietary frequency. Therefore, metrics including data rate, channel filters, and other radio link parameters may be updated for functionality at this proprietary frequency. Note that in some instances, the wearable device 104 may switch back to function under the standardized channel metrics to listen for data that might be destined to the wearable device 104 from another standard device (e.g., smart phone).

Once the radio in the wearable device 104 is updated, method 300 continues to operation 310, where the information carried in the signal received can be processed. For example, in the case of a Bluetooth® connection, the radio link is established and the communication between the wearable device 104 and the connecting device 106 occurs. Thus, if device 106 is a smartphone, then the smartphone may be used to control, for example, the music playing in a room. As another example, if the connection is a WLAN connection, then communication is established between the wearable device 104 and device 106, which may be a router. The signal received is processed to enable a WiFi connection and exchange of content in this instance. These are examples of connections and communications that may exist using method 300, however, other connections and communications may exist and are not limited to these mentioned.

Note that in some instances where the signal received derives from another wearable device 106 looking to pair with the current wearable device 104 over a proprietary frequency, the standardized radio link established by the current wearable device 104 may be used. That is to say, the standardized radio link is used as a relay by the current wearable device 104 to notify the wearable device 106 via an instruction to switch or adapt its channel filter to narrowband, which will enable the communication between the two wearable devices 104,106. For example, if two hearing aids are communicating with a smartphone over a BLE link, the BLE link may be used by a master hearing aid to notify a slave hearing aid to adapt its channel filter so that the two hearing aids may communicate. Similarly, the master hearing aid would also adapt its filter, modulation scheme, data rate and other corresponding physical layer parameters which will enable the communication between the two hearing aids over the proprietary frequency without the need for the BLE link. Alternatively, the two hearing aids may communicate with the BLE enable smartphone and then communicate directly via an instruction by master hearing aid to the slave hearing aid to adapt without the use of the BLE link as a relay.

Figure 4:
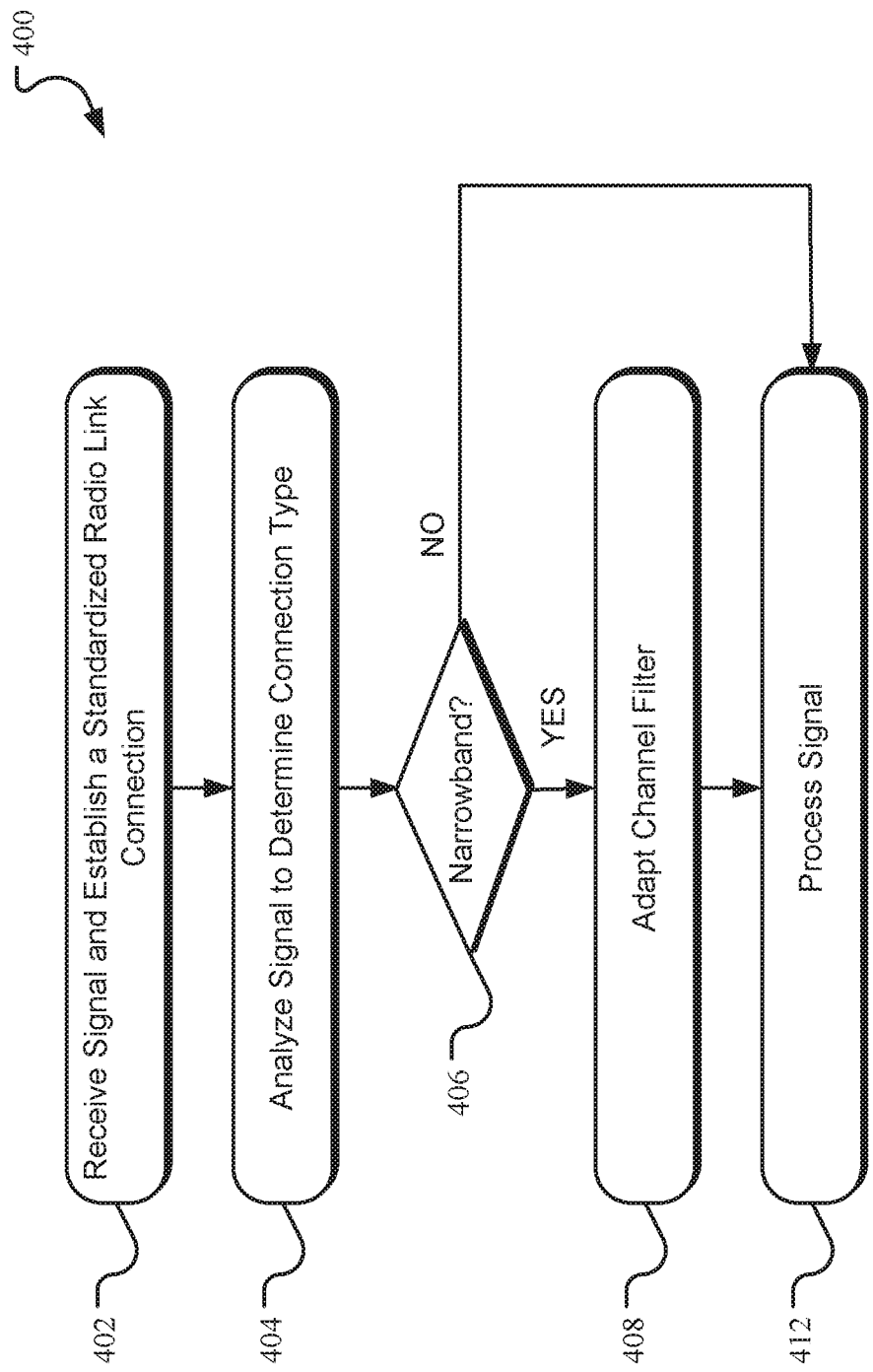
FIG. 4 is a flowchart of a method for dynamic filter adaptation, base in part on the transmission mode of the multiple devices communicating with a wearable device with one radio.

FIG. 4 is a flowchart of a method for dynamic filter adaptation, based in part on the transmission mode of the multiple devices communicating with a wearable device with one radio circuit. In one embodiment, method 400 applies to the radio adaptation that may occur in the wearable device 104 as it communicates with multiple devices of varying bandwidth. For example, method 400 can apply to the radio filter adaption that may occur in the radio of a hearing aid, as the hearing aid of a first ear communicates with a hearing aid of a second ear of a user in narrowband mode. As another example, method 400 can also apply the communication between a hearing aid and a BLE enabled device in wideband mode.

Method 400 begins with operation 402, where the hearing aid receives a signal from a device 106 over a standardized radio link wanting to connect and communicate with the hearing aid. As indicated above, the signal received can derive in response to information sent by the hearing aid or derive directly from device 106 looking to be discovered. In some instances, the signal is detected after being identified by the hearing aid.

In operation 404, the wearable device 104 continues to determine the source of the received signal. In this operation, wearable device 104 analyzes the signal to identify if, for example, the signal received is from the second hearing aid or from the smartphone. To enable interoperability between devices, standards bodies have developed standardized metrics that are to be followed when operating under a given network connection. Therefore, if the signal received is from the smartphone over a Bluetooth Low Energy network, the hearing aid should determine this to ensure correct metrics are being used.

In some instances, the standard bodies identify metrics that enable network transmission over a pre-determined bandwidth. In operation 406, the wearable device 104 determines the bandwidth used in the transmission by the source. In general, a signal may be transmitted in narrowband or wideband (broadband) mode. Wideband mode is the signal transmission where the bandwidth of the information carrying signal is significantly larger than the coherent bandwidth of the channel. Alternatively, narrowband mode is the transmission of a signal whose bandwidth does not significantly exceed the channel's coherent bandwidth. Thus, in narrowband, the frequency response can be considered substantially flat and thus an increased link robustness may be achieved as noise and interference may be avoided.

A tradeoff between both modes is the increase in data rate (data throughput) vs. increase reception sensitivity (reliability) and spectrum efficiency. However, in some instances, the standards bodies have already defined the type of transmission. For example, Bluetooth® communications has been pre-defined as a broadband transmission where the channel bandwidth is set for approximately 1 MHz, and BLE is 2 MHz. Alternatively, a proprietary transmission like ear-to-ear (E2E) communication has not been standardized and thus the transmission mode may be selected as narrowband, since a 100-200 kHz bandwidth will work well for this type of communication.

Therefore, in instances, where Bluetooth® is used, the hearing aid determines that the radio parameters have been pre-defined and thus there is no need to adjust the radio filter or other physical layer metrics as the radio connection established was over a standard radio link. Hence, method 400 continues to operation 412 where the information carried in the signal received is processed. Alternatively, if the source is from, for example the second hearing aid, then the signal transmission is a proprietary design rather than an official FCC allocation and as such, the physical layer parameters are not as heavily regulated and standardized. Thus, a hearing aid communicating with the second hearing aid would communicate over a near field whose bandwidth is narrow compared to the pre-defined 1 MHz bandwidth for Bluetooth® operation.

Once it is determined that a narrowband transmission exists in operation 406, method 400 continues to operation 408, where the physical layer metrics (including the IF filter) are switched/adapted for narrowband transmission. At operation 408, the IF filter of the radio located within the hearing aid is adapted to narrowband mode. As indicated, for E2E communication, a 200 kHz bandwidth may be sufficient for this type of communication. Recall that since narrowband transmission is used in this operation, signal sensitivity will be increased. As an example, in a broadband transmission with a 2 MHz bandwidth, a −101 dBm reception sensitivity may be achieved. Alternatively, a narrowband transmission with 200 kHz bandwidth can achieve reception sensitivity of approximately −120 dBm. Therefore, E2E communication can be successfully achieved using the adaptable IF channel filter located within the hearing aid. The process by which the radio circuit adapts the channel filter in response to the received signal is discussed in more detail below.

Once the IF filters have been adjusted for the desired signal, the signal is filtered, and method 400 continues to operation 412 where the information carried on the signal received is processed. The processing of the signal can then obtain the information sent which can include the mitigation of noise, amplification of signal, or correction of information as transmitted by the first hearing aid to the other. Note that in some instances, the wearable device (e.g., hearing aid) can switch between narrowband and wideband mode to listen for other standard devices wanting to communicate with the hearing aid.

Figure 5:
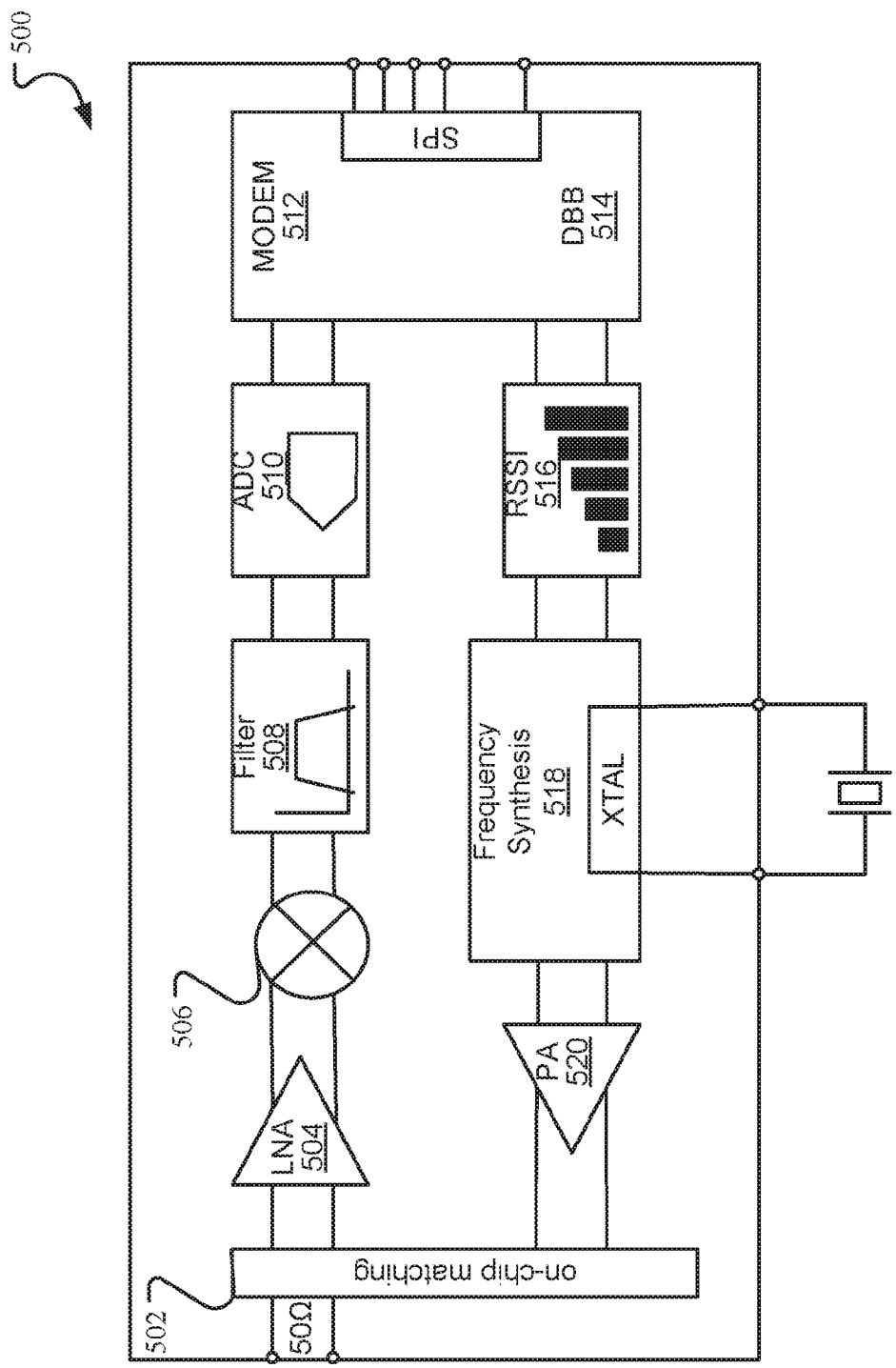
FIG. 5 is a circuit of an exemplary architecture of a wearable device.

As indicated in the multi-device communication methods of FIGS. 3 and 4, communication between the wearable device 104 and two or more devices 106 is occurring. To successfully communicate, the wearable device 104 is equipped with the architecture that allows the wearable device 104 to interact with the multiple devices 106. Specifically, the wearable device 104 includes architecture that allows adaptive filtering to enable the communication with the various devices without the need for multiple antennas. FIG. 5 provides a diagram illustrating such exemplary architecture 500 of the wearable device 104 (e.g., hearing aid).

As is the case with any general wireless transceiver, wearable device 104 will include an antenna for the reception and transmission of signals (not shown). The antenna will connect an analog front-end/mixed signal circuitry where the incoming signal can be matched 502, amplified 504, and down-converted to an appropriate lower, bound channel. Oftentimes, a mixer 506 may be used for the down-conversion of the signal to what is often referred an intermediate frequency (IF). In general, operation at IF frequency is accomplished by mixing the carrier signal with the desired IF obtained from a local oscillator. Down-conversion to the IF frequency is useful so that a fixed frequency may be set for easier use and tuning. Once the signal is operating at IF frequency, the signal may be filtered to obtain a closer match to the desired signal. Filter 508 may be used for such operation, which may be dynamically adapted based on the signal source identified as described above and in conjunction with FIGS. 3 and 4.

In one example, the wearable device 104 may include an internal intermediate frequency (IF) filter 508 that is normally set to 2 MHz (e.g., standard channel width for BLE). During this mode of operation, the radio circuit of the wearable device 104 may operate as a fully BLE compatible device and can communicate with any BLE enabled device. However, as a signal from a source requesting proprietary type communication, the filter 508 may be adapted for this communication. That is to say, filter 508 may be dynamically reprogrammed for the different channel width as may be required by the incoming signal, where less data throughput may be required. Therefore, if the wearable device is a left hearing aid wanting to communicate with the right hearing aid, the filter 508 may adapt by narrowing down a 2 MHz band to an approximately a 200 kHz band, where good audio quality stream (of 11 kHz bandwidth) can be reliably be transmitted. Since ear-to-ear communication includes compressed audio signals, a data throughput of a few hundred kbps will be sufficient. By adapting the filter 508 to the narrower bandwidth, the radio's sensitivity will be optimized for the data throughput needed for better reception. Thus, greater radio reception sensitivity will provide an increase in broadcasting range or alternatively a decrease in power consumption, or increase radio robustness for environments like the human body (for E2E communication) where radio propagation metrics can be more challenging.

After the signal is filtered, the signal can then be digitized via ADC 510. Provided the analog signal is now in digital form, the signal may be processed by modem 512 where channel and source decoding can occur. Note that in most instances, channel and source coding are added redundancies to an information signal (data) to protect from channel and system distortions that may be encountered. Thus, at the receiving end the modem 512 (or other processing unit) will decode the signal.

In some instances, prior to digitizing the signal, the analog signal's strength may be measured using received signal strength indicator (RSSI) 516. The analog signal's strength is measured since it provides an indication of how strong an incoming signal is. Therefore, the higher the RSSI, the stronger the signal and hence the better the reception.

If a signal is to be transmitted, radio architectures such as architecture 500 may include frequency synthesizers that can be used to further tune a signal to be transmitted on a desired channel. The frequency synthesizer may generate a range of frequencies from a single based oscillator and/or by combining frequency mixing processes via frequency multiplication, frequency division, etc. Further, a clock generator can also be included in the frequency synthesis 518. Frequency synthesis is often a function that may be associated with the transmission process and thus may exist prior to the amplification of a signal by power amplifier 520 prior to transmission.

Figure 6:
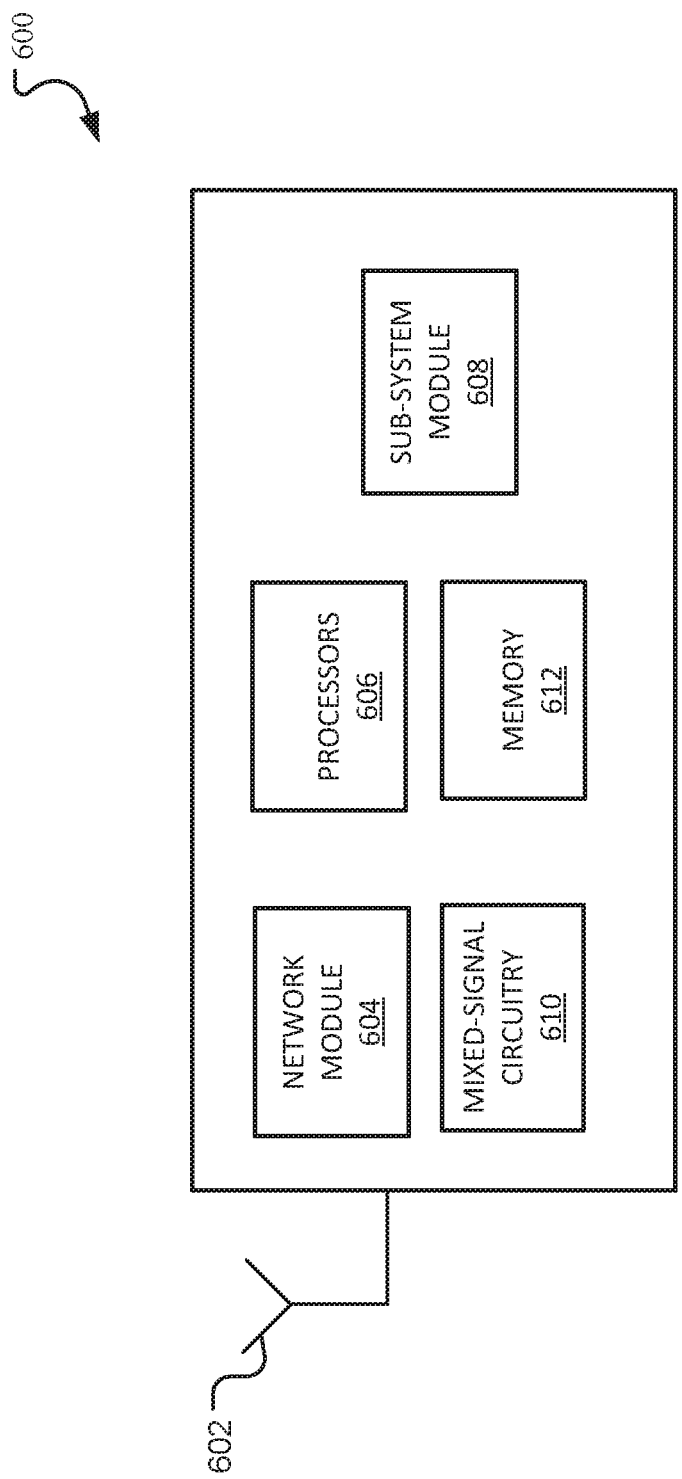
FIG. 6 is a diagram illustrating an example of a computer system which may be used in implementing embodiments of the present disclosure.

Note that the architecture described herein is not limiting. Other components can also be included in the wearable device architecture 500 which are commonly known in the art. Further, FIG. 6 is included which describes some of the modules that may further exist. Thus, FIG. 6 is a block diagram 600 of an example wearable device 104 which can be used in implementing the embodiment of the present disclosure.

As indicated, wearable device 104 can be any device (e.g. hearing aid) capable of communicating over a network using long range and/or short range communications. Wearable device 104 can include one or more processors 606 including computer system 204 which can be used to process the information received from one or more of the external devices (e.g., the other hearing aid, television, smart phone, etc.).

Processor 606 can be coupled to at least a bus (not shown), controllers, memory and other modules. For example, the processors can communicate with a memory module 612 which can include one or more memory cards, control circuits, sub-memory modules 202, etc. Memory module 612 can further include a dynamic storage device, random access memory (RAM), read only memory (ROM) and/or other static storage devices that can be used for storing temporary and long term variables and other intermediate information during the execution of instructions by the processors 606. The memory module 612 can also be used for storing and transmitting information in a form of a software or processing application readable by the computing system 204. The processor 606 can also acquire and process data received from wearable sensors (not shown) which can collect information related to vital signs (e.g., body temperature, blood pressure, heart rate, oxygen levels, and the like).

Sub-system module 608 can also be included in the architecture of the wearable device 104. The sub-system module 608 for example can include the components responsible for determining for example the source from which a signal received derives from. Additionally or alternatively, the sub-system module 608 can include other components that may be needed in communication between wearable device 104 and the two or more other devices 106.

For communicating with one or more other devices and/or networks, wearable device 104 can include a network module 604. Network module 604 can be a module that allows for communication between the wearable and at least one or more devices 106 on the current network, secondary backup network, etc. Network module 604 can enable the transmission of information being processed by processors 606 over the air via network interface 206 with the aid of mixed-signal circuitry 610. The mixed-signal circuitry 610 can be a signal conditioning module that enables the transmission and conversion of digital signals into analog signals for channel transmission. The mixed-signal circuitry 610 can include filters, quantizers, amplifiers and even analog to digital converters (as described above and in conjunction with FIG. 5) for interfacing between the network module 604 and the one or more antennas 602. Mixed-signal circuitry 610 can also be used to interface with sensors to acquire information on vital signs (e.g., body temperature, blood pressure, heart rate).

Antenna 602 can be used for the wireless transmission of signals in instances where the primary and/or backup service is wireless. Antenna 602 on wearable device 104 can be one or more antennas that can be used for single input single output (SISO) transmission, multiple input single output (MISO) transmission, single input multiple output (SIMO) transmission, or multiple input multiple output (MIMO) transmission as commonly used in cellular communications. The use of multiple antennas 602 can be used to provide increase efficiency and data throughput by taking advantage of spatial and multiplexing diversity. Further, MIMO communications provide increased reliability as the information stream can be sent multiple times over the various antennas in order to overcome possible nulls or deep fades in a channel transmission. Still further, the use of antenna 602 can enable communication over various wireless networks including WLAN, cellular, WMAN, WPAN, etc., including mesh network interconnectivity.

In one embodiment, antenna 602 to can be of any type and shape suitable for use in a wearable device 104. Because an antenna's efficiency directly influences the tradeoff between power consumption and broadcasting range, identifying an antenna well suited for a hearing aid is very important. Therefore, any antenna that may be identified that will allow both far and near field use is important such that the same radio IC may be used by the single antenna. For example, a flex based symmetrical antenna may be used for a hearing aid and can be interchangeably placed in the hearing aid shell for use in the left or right ear. The flex based symmetrical antenna is an antenna with flexible symmetrical flaps that is small in size and whose antenna flaps can fold into place which is appropriate for a small device like a hearing aid.

The system set forth in FIG. 6 is but one possible example of a computer system that may employ or be configured in accordance with aspects of the present disclosure. FIG. 6 illustrates a system architecture for signal communication on a device including wearable device 104 (e.g., hearing aid). The computer architecture described is very simplified and can contain additional systems for performing additional processes within the hearing aid. The hearing aid can work jointly or independently of the additional systems that can exist within the device, external devices, and/or networks. The components of the hearing aid may communicate over any number of networks, including telecommunication networks and wireless networks. Further, it should be noted that the hearing aid may include any number of additional or fewer components, including components used to communicate between the components shown. Also, the functionality of the components described may be applied to two or more components of the system. For example, the filter adaptation module 208 may be used for the dynamically adapting the physical link layer parameters for communication in standardized or proprietary mode.

Note that the embodiments of the present disclosure include various operations or steps. The steps may be performed using information from hardware components, and may be embodied in hardware components or may be embodied in machine-executable instructions, which may be used to cause a general-purpose or special-purpose processor (e.g., a processing unit of device) executing the instructions to perform the steps. Alternatively, the steps may be performed by a combination of hardware, software and/or firmware.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method, comprising:
    configuring a first device for receiving a signal to establish
    a radio link with a second device in response to the signal received wherein the second device communicates using one of a standard communication protocol or a proprietary spectrum;
    configuring the first device to analyze the signal received over the radio link to determine a connection type and an associated channel bandwidth;
    configuring the first device to dynamically adapt a programmable channel filter in the first device at least based in part on the associated channel bandwidth and the connection type, wherein the adapting of the programmable channel filter comprises forming a channel bandwidth of the programmable channel filter to a wide bandwidth, and adjusting the programmable channel filter to a narrow bandwidth in response to determining the connection type of the proprietary spectrum; and
    processing the signal received at the first device.

2. The method of claim 1, wherein the received signal is filtered by the adapted programmable channel filter.

3. The method of claim 1, further comprising:
    configuring the first device to dynamically adapt the channel bandwidth of the programmable channel filter back to the wide bandwidth.

4. The method of claim 1, including configuring the first device to adjust the channel bandwidth to approximately 100-200 KHz for the narrow bandwidth and to form the channel bandwidth to approximately 2 MHz for the wide bandwidth.

5. The method of claim 1, wherein the signal received is a far-field transmission from the second device.

6. The method of claim 1, wherein the signal received is a near-field transmission from the second device.

7. The method of claim 6, wherein a channel bandwidth of the second device is adapted during the near-field transmission.

8. The method of claim 1, wherein the device is a hearing aid.

9. A system, comprising:
    at least one radio, the at least one radio configured to:
        receive a signal to establish
        a radio link with a device in response to the signal received wherein the device communicates using one of a standard communication protocol or a proprietary spectrum;
        analyze the signal received over the radio link to determine a connection type and associated channel bandwidth;
    a filter adaptation module, the filter adaptation module configured to:
        dynamically adapt a programmable channel filter at least based in part on the associated channel bandwidth and the connection type, wherein the adapting of the programmable channel filter comprises forming a channel bandwidth of the programmable channel filter to a narrow bandwidth in response to determining the connection type of the proprietary spectrum; and
    a processor, the processor configured to:
        process the signal received.

10. The system of claim 9, wherein the received signal is filtered by the adapted programmable channel filter.

11. The system of claim 9, wherein the channel bandwidth of the programmable channel filter is a wide bandwidth before the signal is analyzed.

12. The system of claim 9, further comprising:
    the filter adaptation module configured to:
        adapt the programmable channel filter from the narrow bandwidth to a wide bandwidth.

13. The system of claim 9, wherein the signal received uses a near-field transmission.

14. The system of claim 13, wherein a channel bandwidth of the device is adapted during the near-field transmission.

15. The system of claim 13, wherein the near-field transmission is over a proprietary frequency.

16. The system of claim 9, wherein the system is a hearing aid.

* * * * *